May 15, 1956  J. E. AKKANEN  2,745,207
FISHING LURE
Filed June 19, 1953
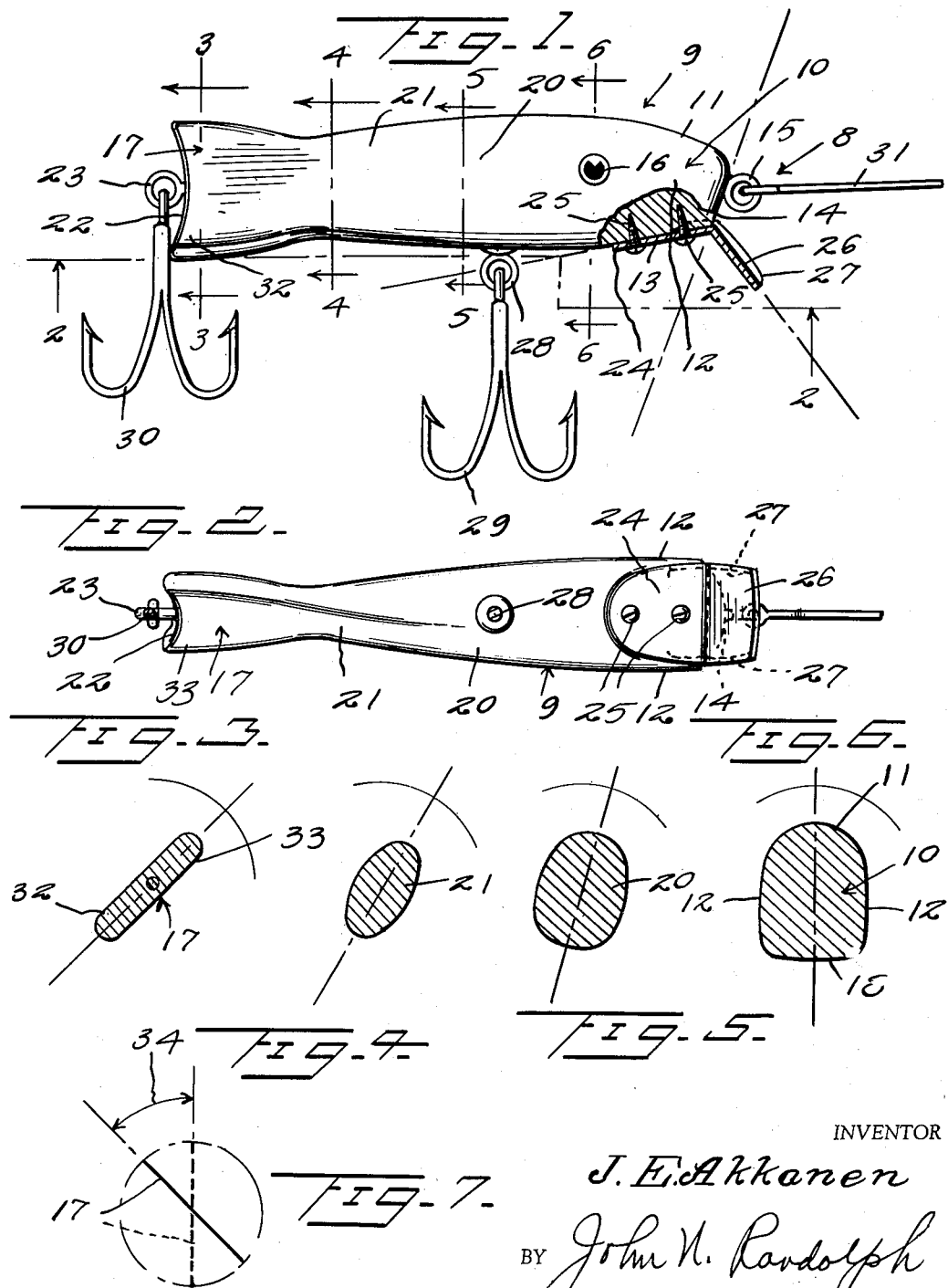
INVENTOR
J. E. Akkanen
BY John N. Randolph
ATTORNEY

United States Patent Office 2,745,207
Patented May 15, 1956

2,745,207

FISHING LURE

John E. Akkanen, Sault Ste. Marie, Mich.

Application June 19, 1953, Serial No. 362,776

4 Claims. (Cl. 43—42.47)

This invention relates to an artificial fishing lure and more particularly to a novel construction of lure body or plug which very realistically simulates the appearance of a minnow.

More particularly, it is an aim of the present invention to provide a lure body or plug having an extremely novel shape whereby when the lure body is drawn through the water or is held in the water against a current the movement of the body by contact with the water passing relatively thereto will produce a very realistic simulation of the swimming movement or action of a minnow and the appearance of the lure body from any angle will very realisticaly conform to the appearance of a live minnow.

More particularly, it is an aim of the present invention to provide a lure body having a novel twisted and tapered shape whereby the natural appearance of a minnow and the simulation of the swimming movement of a minnow is very realistically reproduced.

A further object of the invention is to provide a lure body which due to the shape thereof will oscillate about its longitudinal axis when drawn through the water or when held in a current so that the tail portion of the lure will whip laterally similar to the tail movement of a swimming minnow and while the head portion will appear to move in a straight line, thus producing the illusion that the lure is being propelled through the water by the motion of the tail portion thereof.

Various other objects and advantages of the invention will hereinafter become more fully apparent from the following description of the drawing, illustrating a presently preferred embodiment thereof, and wherein:

Figure 1 is a side elevational view, partly in section of the artificial lure;

Figure 2 is a bottom plan view thereof, taken substantially along a plane as indicated by the line 2—2 of Figure 1;

Figures 3, 4, 5 and 6 are cross sectional views through the lure body taken substantially along planes as indicated by the lines 3—3, 4—4, 5—5 and 6—6 of Figure 1, and Figure 7 is a diagrammatic view of the trailing end or tail portion of the lure as it appears looking from left to right of Figure 1 and illustrating the oscillating motion thereof.

Referring more specifically to the drawing, the novel artificial fishing lure in its entirety is designated generally 8 and includes an elongated lure body, designated generally 9. The forward portion of the lure body 9 constituting the head portion, designated generally 10, has a top portion 11 which is rounded both longitudinally and transversely and side portions 12 which are likewise slightly rounded and convex. The head portion 10 also includes a substantially flat bottom part 13 which is disposed at a slight upward and forward inclination. The head portion 10 has a flat front face 14 extending downwardly and rearwardly from the forward end of the top portion 11 and the upper end of which is disposed at substantially the level of the longitudinal center of the lure body 9. A leader attaching eye 15 is secured in the head portion 10 and extends outwardly from the front face 14. The sides 12 of the head portion 10 at points spaced rearwardly a substantial distance from the front face 14 are suitably marked or inscribed to simulate eyes 16.

The lure body 9, from approximately the eyes 16 thereof to the tail 17, is tapered and twisted. Adjacent the eyes 16 or through the rear part of the head portion 10, the cross sectional shape is substantially as previously described except that the bottom portion 18 is convexly rounded slightly both longitudinally and transversely. Further to the rear, as illustrated in Figure 5, the taper of the horizontal and vertical thickness of the intermediate portion 20 is more pronounced, and still further to the rear and forwardly of but adjacent the tail 17, the body portion 21 is substantially reduced in width horizontally thereof and reduced to a lesser extent in width or thickness vertically. The tail portion 17, as illustrated in Figure 3, is relatively wide as compared to its thickness, the width thereof being substantially equal to the thickness vertically of the head portion 10 and substantially greater than the vertical thickness of the body portions 20 and 21. The tail 17 is provided with a concavely arced rear end 22 from which projects a hook supporting eye 23 which is anchored in the tail portion 17.

It will be noted that the twist of the lure body from the eyes 16 rearwardly and looking from front to rear of the lure is in a clockwise direction, the twist being relatively slight as illustrated in Figure 5 in the vicinity of the body portion 20, more pronounced adjacent the body portion 21 as illustrated in Figure 4, and substantial at the tail portion 17 as illustrated in Figure 3.

An end 24 of a plate is disposed against the flat bottom surface 13 of the head and secured thereto by screw fastenings or the like 25. The other end 26 of the plate extends downwardly and forwardly from the forward end of the surface 13 and from the lower rear end of the face 14 to form a diving plate which is disposed at an obtuse angle to and below the face 14. The diving plate 26 has upwardly or forwardly bent side edges 27.

A hook supporting eye 28 is anchored in the body portion 20 and extends downwardly from the underside thereof and swingably suspends a fishhook 29 below the intermediate portion of the lure body. A second fishhook 30 is suspended from the tail 17 by the eye 23. A leader 31 is attached to and extends forwardly from the front leader engaging eye 15.

Figure 1 illustrates the normal position of the lure 8 in the water when it is not in motion and when a current is not causing the water to move relatively to the lure when the lure is being held in a current so that the water is moving relatively to the lure from right to left of Figure 1 or when the lure is being drawn forwardly through the water from left to right of Figure 1, the water will impinge against the tail portions 32 and 33 of the tail 17 which are disposed on opposite sides thereof and adjacent the bottom and top edges of the tail, respectively, as illustrated in Figures 1, 2 and 3. This will cause the lure body 9 to turn about its longitudinal axis in a clockwise direction as viewed from left to right of Figure 1 or looking from the tail 17 toward the front of the lure. This turning motion is best illustrated in Figure 7 wherein the normal position of the tail is shown by the full line. The arrow 34 indicates the approximate arc of turning movement of the tail 17 to its dotted line position and in which the tail is disposed in substantially a vertical plane. As this occurs, the eye 28 will swing upwardly with the lure body and the weight of the hook 29 will resist clockwise rotation of the tail past its dotted line position of Figure 7. Furthermore, this upward movement of the upper tail portion in its approximately 45° clockwise turning will also cause the head portion 10 to turn in the same direction thereby canting the diving plate 26. The force of the water striking the canted diving plate and the canted face 14 will provide the primary force for resisting further turning movement of the tail and as the tail portions 32 and 33 will have moved out of position to receive the force of the water passing the lure body, when the tail 17 is in its dotted line position of Figure 7, the force of the water against the diving plate 26 and the face 14 plus the pull exerted by the weight of the hook 29 will cause the lure 8 to then turn about its longitudinal axis in the opposite direction. As the tail 17 again approaches its initial position as illustrated by the solid line in Figure 7, the force of the water then again impinging against the tail portions 32 and 33 will stop this counterclockwise rotation of the lure body and the clockwise rotation thereof, as previously described, will be repeated. Thus, as the lure is drawn through the water or held in a current it will oscillate about its longitudinal axis through an arc of approximately 45° but will always be prevented from making a complete rotation in either direction, for the reasons as heretofore pointed out.

The gradual taper and twist of the lure body 9 from the eyes 16 back to the tail 17, imparts to the bait its minnow-like appearance and the minnow-like swimming action, previously described. This also produces the illusion that the tail 17 is propelling the bait through the water as the tail whips laterally to either side of the center line of the path of movement of the bait, which constitutes the natural propulsion means of a minnow. This illusion stems from the fact that the sides of the bait from the eyes 16 to the tail 17 appear to flex in opposite directions as the lure 9 oscillates about its longitudinal axis and this illusion exists regardless of from what angle the minnow is observed since the tail 17 alternately appears to become thicker or thinner depending upon which way the lure is turning.

The lure body 9 may be formed of various materials, may be made in various sizes and may be either buoyant or non-buoyant depending upon whether the lure is to be used as a surface or sub-surface lure, respectively.

Various modifications and changes are contemplated and may be resorted to, without departing from the spirit or scope of the invention as hereinafter defined by the appended claims.

I claim as my invention:

1. In a lure of the character described, an elongated rigid lure body having a forward part defining a head portion and a rear part defining a tail portion, said head portion having a horizontal axis and a vertical axis and being of substantial thickness both horizontally and vertically thereof relative to the remainder of the lure body, said lure body being tapered in thickness both horizontally and vertically from adjacent said head portion to adjacent the tail portion thereof, said tail portion being wide and thin relative to the tapered lure body portion and being substantially flat and disposed in the plane at an angle to the horizontal and vertical axes of said head portion, said lure body being twisted from adjacent said head portion to the tail portion, a plate secured to said lure body and extending downwardly and forwardly from the underside of the forward end of the head portion thereof, said plate functioning with the tail portion to cause the lure body to oscillate about its longitudinal axis when drawn through the water or when held in a moving body of water with the head portion thereof facing into the current.

2. In a fishing lure as in claim 1, said head portion having a substantially flat face at its forward end inclined upwardly and forwardly from the upper inner end of said plate and cooperating with the plate to cause the lure body to rotate in one direction about its longitudinal axis after the lure body has been rotated about its longitudinal axis in the opposite direction by water pressure impinging against portions of said lure body tail.

3. In a fishing lure as in claim 2, said plate having upwardly and forwardly flared side edges.

4. In a fishing lure as in claim 3, and a fishhook suspended from the underside of an intermediate portion of the lure body and cooperating with said plate and forward face to cause rotation of the lure body in one direction by rotation of the fishhook relatively to the longitudinal axis of the lure body from an elevated position caused by the lure body being rotated in the opposite direction by water pressure against the tail.

References Cited in the file of this patent

UNITED STATES PATENTS

| | | |
|---|---|---|
| D. 160,802 | Marshall et al. | Nov. 7, 1950 |
| 1,777,004 | Lemere et al. | Sept. 30, 1930 |
| 2,494,384 | Gadzinski et al. | Jan. 10, 1950 |
| 2,583,616 | Waddell | Jan. 29, 1952 |
| 2,592,445 | McCarthy | Apr. 8, 1952 |
| 2,665,516 | Race | Jan. 12, 1954 |
| 2,706,360 | Arent | Apr. 19, 1955 |